(12) United States Patent
Khan et al.

(10) Patent No.: US 6,417,987 B1
(45) Date of Patent: Jul. 9, 2002

(54) DISC DRIVE CONTAMINATION REDUCTION UTILIZING AN INERT COATING

(75) Inventors: Raquib U. Khan, Pleasanton; Mohammad M. Ameen, Campbell, both of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/704,112

(22) Filed: Oct. 30, 2000

Related U.S. Application Data
(60) Provisional application No. 60/162,433, filed on Oct. 28, 1999.

(51) Int. Cl.[7] .................................. G11B 17/02
(52) U.S. Cl. .................................. 360/97.02
(58) Field of Search .......................... 360/97.02, 97.03, 360/99.08

(56) References Cited

U.S. PATENT DOCUMENTS

| | | | |
|---|---|---|---|
| 5,980,113 A | 11/1999 | Grantz | |
| 6,130,802 A | 10/2000 | Rhaman et al. | |
| 6,181,509 B1 * | 1/2001 | Canlas et al. | 360/99.08 |
| 6,211,584 B1 * | 4/2001 | Kurosawa et al. | 360/99.08 |

* cited by examiner

*Primary Examiner*—Robert S. Tupper
(74) *Attorney, Agent, or Firm*—Moser Patterson & Sheridan LLP

(57) ABSTRACT

A non-reactive hard coating of carbon or ceramic is applied to the major components of the spindle motor which are exposed to the atmosphere internal to the hard disc drive. By having such a thin layer of carbon or other ceramic coating, it will protect against outgassing of motor components and create a neutral or non-reactive surface that does not promote corrosion. The coating thickness can be preferably in the order of nanometers to microns depending upon the drive design and the operating conditions.

14 Claims, 2 Drawing Sheets

DISC DRIVE CONTAMINATION REDUCTION UTILIZING AN INERT COATING

CROSS-REFERENCE TO A RELATED APPLICATION

This invention is based on U.S. Provisional Patent Application Serial No. 60/162,433 filed Oct. 28, 1999, entitled DRIVE CONTAMINATION REDUCTION DUE TO METAL ADDITIVES OUTGASSING IN SPINDLE MOTOR BY HAVING AN INERT COATING, invented by inventors Raquib U. Khan and Mohammad M. Ameen. The priority of that application is hereby claimed.

FIELD OF THE INVENTION

The invention relates to hard disc drives, and more specifically to the reduction of contamination within the housing of a hard disc drive.

BACKGROUND OF THE INVENTION

Magnetic disc drives are used for storing information. In such a disc drive, a magnetic disc rotates at high speed, and a transducing head flies over a surface of the disc. This transducing head records information on the disc surface by impressing a magnetic field on the disc. Information is read back using the head by detecting magnetization of the disc. The transducing head is moved radially across the surface of the disc so that different data tracks can be read back.

Over the years, storage density has tended to increase and the size of the storage system has tended to decrease. This trend has led to greater precision and lower tolerance in the manufacture and operation of magnetic storage discs. For example, to achieve increased storage densities, the transducing head must be placed increasingly close to the surface of the storage disc. Further, each of the bits is packed more closely together on the disc surface. All of this means that any contamination within the disc drive can have a negative effect on the recording and reproducing capabilities of the disc drive. The contamination which can have a negative effect on the efficiency and data storage capability of the drive can be generated by any part of the drive including the spindle motor.

Material choice for the spindle motor is one of the critical factors in reducing risk of contamination for various reasons. It has been a common practice to make motor components from free machining steels, e.g. 430F, 303, etc., which contain free machining additives like sulfur, selenium, tellurium, etc. Most of these additives have much higher vapor pressure than other alloying elements found in steel and other alloys. As a result, these elements, especially sulfur, have a substantial tendency to outgas if they remain in the form of free sulfur. Such elements are susceptible to outgassing even in the form of manganese sulfide, which is the most common form of sulfur in an alloy of the type which is commonly used in a spindle motor. At elevated temperature and in the presence of moisture, manganese sulfide reacts to form hydrogen sulfide that causes severe damage to the drive components by having corrosive effect.

One of the common methods of reducing such outgassing is passivation. However, passivation brings new problems as most passivation processes include use of strong acids like nitric acid or sulfuric acid. The use of acids results in the formation of anions such as nitrate which themselves can cause contamination problems. Therefore, the need continues to exist for an effective method to reduce generation of contaminants by a spindle motor.

SUMMARY OF THE INVENTION

In summary, the present design is intended to reduce or eliminate contaminants thrown off by a spindle motor incorporated in a disc drive.

In a preferred form of the present invention, a non-reactive hard coating of carbon or ceramic is applied to the major components of the spindle motor which are exposed to the atmosphere internal to the hard disc drive. By having such a thin layer of carbon or other ceramic coating, it will protect against outgassing of motor components and create a neutral or non-reactive surface that does not promote corrosion. The coating thickness can be preferably in the order of nanometers to microns depending upon the drive design and the operating conditions.

Other features and advantages of this invention will be apparent to a person of skill in the art who studies the invention disclosure. Therefore, the scope of the invention will be better understood by reference to an example of an embodiment, given with respect to the following figures.

DETAILED DESCRIPTION OF A PREFERRED EMBODIMENT

Figure 1:
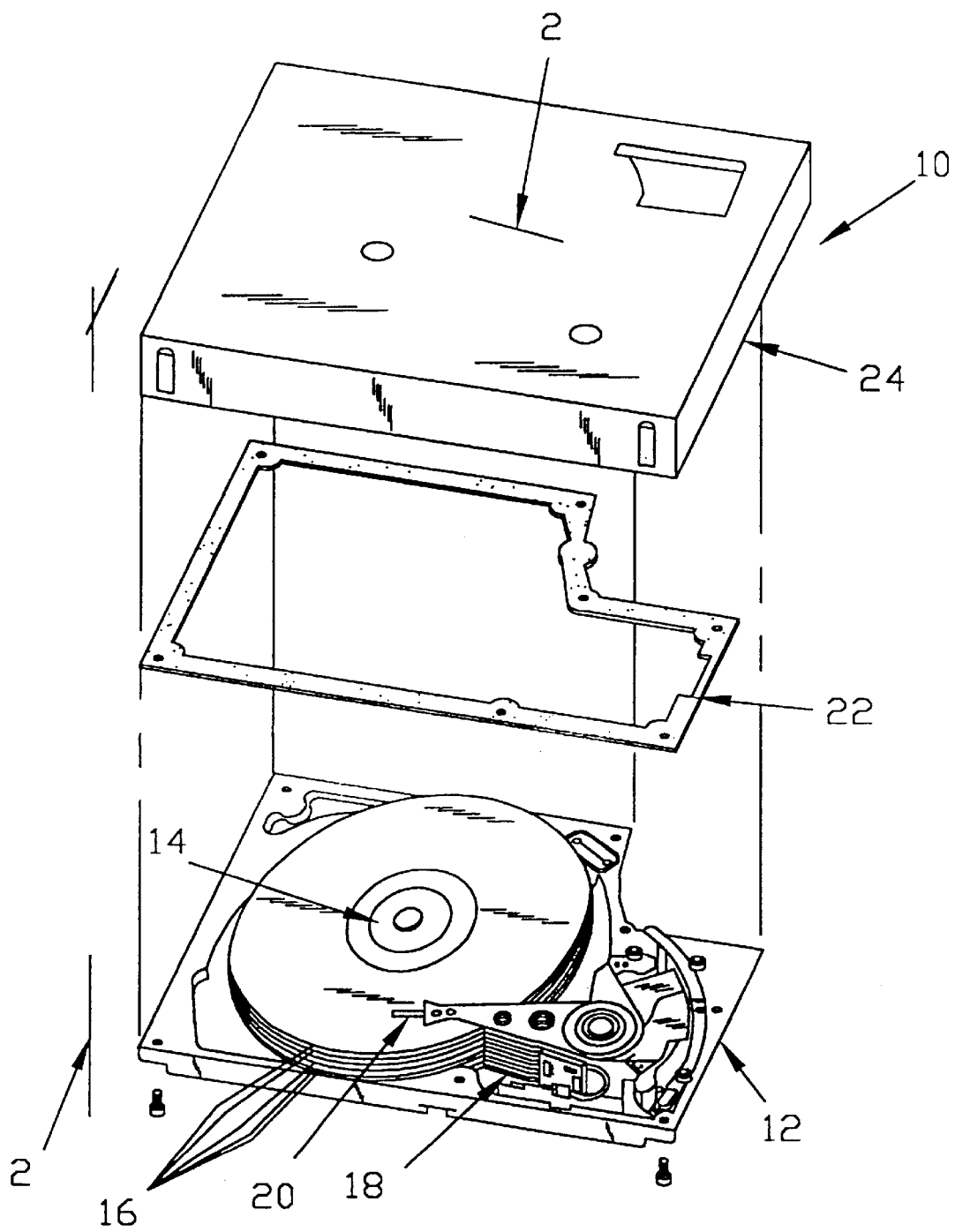
FIG. 1 is an exploded view of a disc drive in which the present invention is useful.

FIG. 1 is an exploded perspective view of a magnetic disc drive storage system in which the present hydrodynamic bearing cartridge could be used. In the example to be discussed below, the use of the hydrodynamic bearing and associated cartridge will be shown in conjunction with a spindle motor. Clearly, this invention is not limited to use with this particular design of a disc drive, which is shown only for purposes of the example. Further, although an exemplary motor design is used to describe the invention, it is useful with a wide variety of motors, especially those using fluid dynamic bearings, and is not to be limited to the motor shown.

In this particular example, the storage system 10 includes a housing base 12 having spindle motor 14 which rotatably carries storage discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a radially differentiated track on the surface of the discs 16. This allows the transducers 20 to read and write magnetically encoded information on the surfaces of discs 16 at selected locations. The discs rotate at very high speeds, several thousand RPM, in order to maintain the transducer flying over the surface of the disc. In present day technology, the spacing distance between the transducer and the rotating disc surface is measured in microns; therefore, any contamination of the disc or transducer can have serious negative impact.

Figure 2:
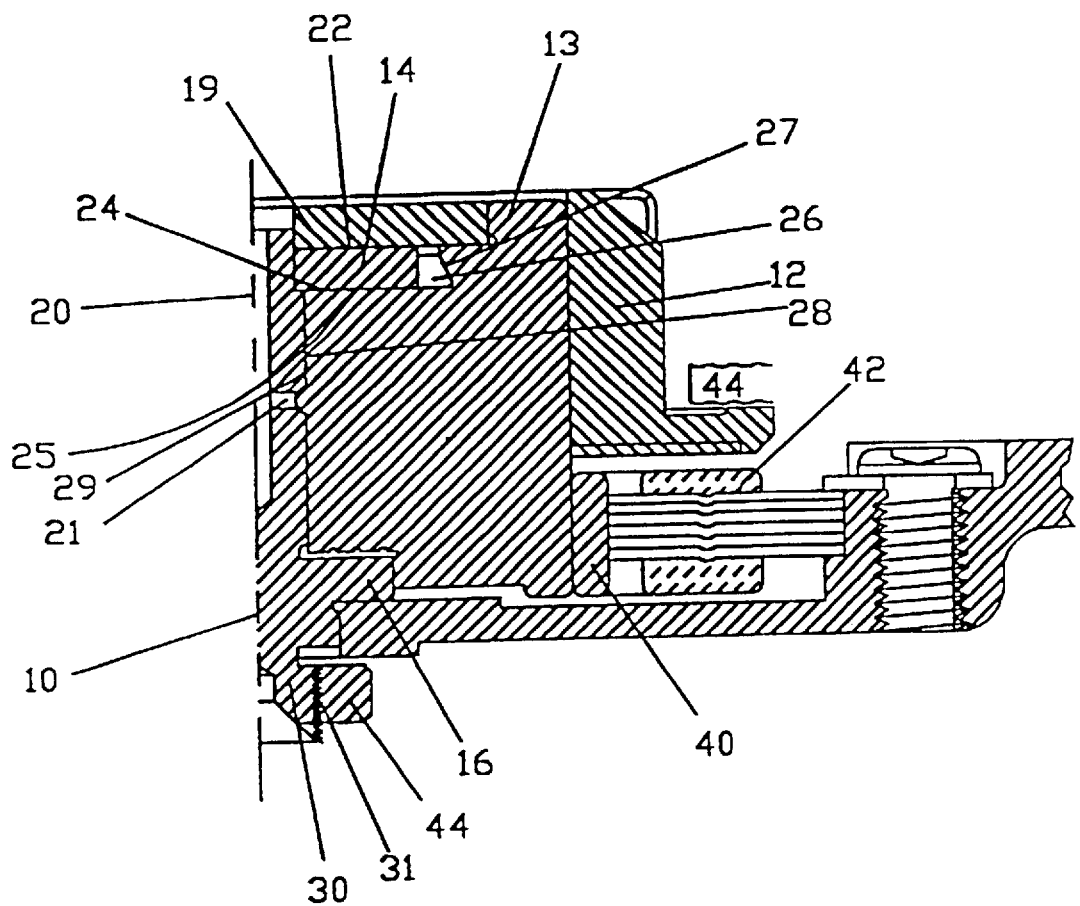
FIG. 2 is a sectional view of a typical spindle motor in which the present invention may be used.

FIG. 2 is a vertical sectional view of a single thrust plate hydrodynamic bearing motor design of a type which is already established in this technology. The basic structure of the motor shown in this figure includes a stationary shaft 10 and a hub 12 supported from a sleeve 13 for rotation around the shaft. The shaft 10 includes a thrust plate 14 at one end, and terminates in a shoulder 16 at the opposite end. The sleeve 13 supports a counterplate 19 at one end, for rotation over the thrust plate 14. The counterplate 19 and thrust plate 14 are separated by a sufficient gap 22 to allow circulation of lubricating fluid to lubricate the hydrodynamic bearing out of the reservoir 20, through the gap 22, through the reservoir 26 defined between the end of the thrust plate 14 and an interior surface 27 of the sleeve 13, and between the lower surface 24 of the thrust plate 14 and an upper surface 25 of the sleeve 13, and between an inner surface 28 of the sleeve and the exterior surface 29 of the fixed shaft. The fluid returns to the reservoir primarily through a central bore 21. In order to promote the flow of fluid over the bearing surfaces which are defined between the thrust plate 14 and the counterplate 19; between the thrust plate 14 and the sleeve 13; and between the shaft 10 and the sleeve 13, typically one of the two opposing surfaces of each such assembly carries sections of grooves as is well known in this technology.

The fluid is supplied to all of the lubricated surfaces from the reservoir 20 to flow over the bearing surfaces and be returned to the reservoir through the bore 21. The remainder of the structure of significance which is used to complete the motor design include shaft extension 30 which ends in threaded region 31 which is threaded into a portion of the base 44. A stator 42 cooperates with magnets 40 which are supported from the sleeve 13, with energization of the stator windings 42 causing rotation of the sleeve 13 and the hub 12 about the stationary shaft.

The material chosen for the primary elements of the spindle motor described above including the exposed surface of the sleeve 13, the hub 12, and the counterplate 19 become a critical factor in reducing the generation of contaminants. The materials used for all of these elements have a tendency to outgas, especially if they contain free machining additives like sulfur, selenium or tellurium. They are especially susceptible to outgassing in the form of manganese sulfide.

As described above, at elevated temperature and in the presence of moisture such as in a moist environment and where the hard disc drive housing is not airtight, the manganese sulfide can react to form hydrogen sulfide and cause severe damage to drive components by having a corrosive effect.

Therefore, pursuant to the present method, a non-reactive hard coating of carbon or ceramic would be applied to the major elements of the motor prior to their assembly into a completed motor. For example, the hub 12, sleeve 13 and counterplate 19, as well as even the shaft 16, are separately fabricated. Each of these could be separately coated by known processes with a thin coating of carbon or ceramic. In fact, even the base 44 which supports the motor could be coated with a non-reactive coating if the base is formed out a material susceptible to outgassing. By thereby stopping corrosion on the metal surface of the motor, this also eliminates the possibility of hard disc interface contamination which would be result of direct outgassing from the material or consequent outgassing and transfer of the corrosive material from the exposed corroded motor parts. The coating thickness can be in the order of nanometers to microns depending upon the drive design and operating conditions.

Certain parts are more important to be coated than others. For example, the outer surface of the hub 12 since it constitutes the largest exposed surface and is closest to the disc 44 should be coated. Next in priority if it is made of a material that contains additives that make outgassing more likely would be the counterplate or similar element of the hydrodynamic bearing which is typically found at an end of the shaft and presenting a substantial exposed surface to the air. Certainly, if the housing is made of a material which is susceptible to the possibility of outgassing should also be coated.

Other features and advantages of this invention should be apparent to a person of skill in the art who studies the above disclosure. Therefore, the scope of this invention should be limited only by the following claims.

What is claimed:

1. In a disc drive comprising a housing incorporating a base and cover defining an enclosed space wherein a spindle motor supported from the base supports one or more discs for rotation, the spindle motor comprising a shaft, hub, the hub supporting a magnet aligned with windings whose energization causes interaction with the magnet to rotate the hub, the hub supporting one or more discs on an outer surface thereof, and wherein one or more of the major components of the spindle motor which are exposed to the atmosphere internal to the housing of the hard disc drive, is coated with a non-reactive coating material to reduce generation of contaminant by the spindle motor, the coating material being selected from the group comprising carbon and ceramic.

2. A disc drive as claimed in claim 1 wherein at least the hub of the motor is coated with the non-reactive coating material.

3. A disc drive as claimed in claim 1 wherein the spindle motor includes at least one seal at an end of a hydrodynamic bearing along the shaft of the motor, the elements of the seal which are exposed to the internal atmosphere of the housing being coated with the non-reactive coating.

4. A disc drive as claimed in claim 1 wherein the spindle motor further comprises a counterplate supported from a sleeve surrounding the shaft and supporting the hub on the outer surface thereof, at least the counterplate being coated with the non-reactive coating material.

5. A disc drive as claimed in claim 1 wherein at least the base of the housing is coated with the non-reactive coating material.

6. In a disc drive comprising a housing incorporating a base and cover defining an enclosed space wherein a spindle motor supported from the base supports one or more discs for rotation, the spindle motor comprising a shaft, hub, the hub supporting a magnet aligned with windings whose energization causes interaction with the magnet to rotate the hub, the hub supporting one or more discs on an outer surface there, the spindle motor comprising means for reducing generation of contaminants by the spindle motor.

7. A disc drive as claimed in claim 6 wherein the means for reducing generation of contaminants comprises a coating of a non-reactive material selected from the group consisting of carbon and ceramic.

8. A disc drive as claimed in claim 7 wherein at least the hub is coated with the non-reactive coating material.

9. A disc drive as claimed in claim 7 wherein at least the base is coated with a non-reactive coating material.

10. A disc drive as claimed in claim 7 wherein the spindle motor further comprises a counterplate supported from a sleeve surrounding the shaft and supporting the hub on the outer surface thereof, at least the counterplate being coated with the non-reactive coating material.

11. In a disc drive comprising a housing incorporating a base and cover defining an enclosed space wherein a spindle motor supported from the base supports one or more discs for rotating, the spindle motor comprising a shaft, hub, the hub supporting a magnet aligned with windings whose energization causes interaction with the magnet to rotate the hub, the hub supporting one or more discs on an outer surface thereof, a method of reducing contamination generation of the spindle motor including coating at least one element of the spindle motor and housing which is exposed to the internal atmosphere of the disc drive housing with a coating of non-reactive material selected from the group consisting of carbon and ceramic to reduce generation of contaminants.

12. A method of reducing contamination in a disc drive as claimed in claim 7 including the step of coating at least the base of the housing with the non-reactive material.

13. A method as claimed in claim 7 including the step of coating at least the hub of the motor with the non-reactive material.

14. A method as claimed in claim 7 wherein the motor further includes a counterplate supported from a sleeve surrounding the shaft and supporting the hub on the outer surface thereof, and including the step of coating an outer surface of the counterplate with the non-reactive material.

* * * * *